Aug. 15, 1939.  L. J. KNAPP ET AL  2,169,649
GRATING
Filed May 5, 1938  2 Sheets-Sheet 1
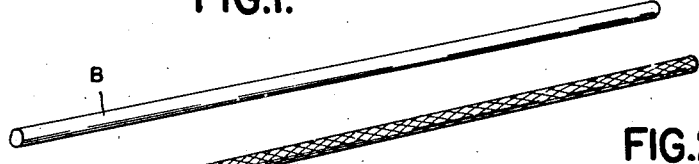
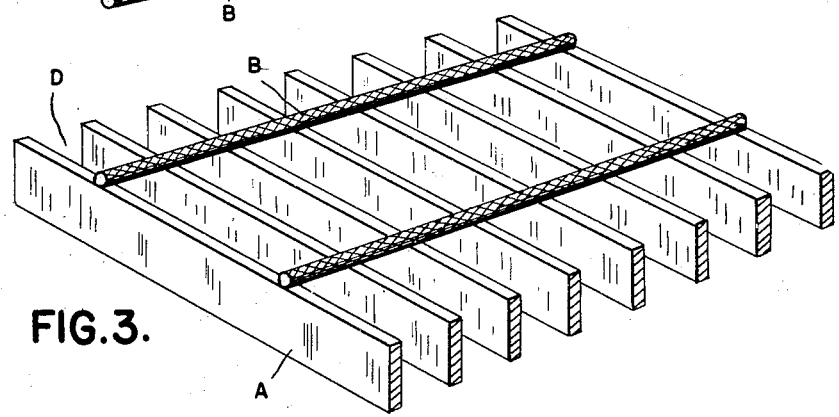
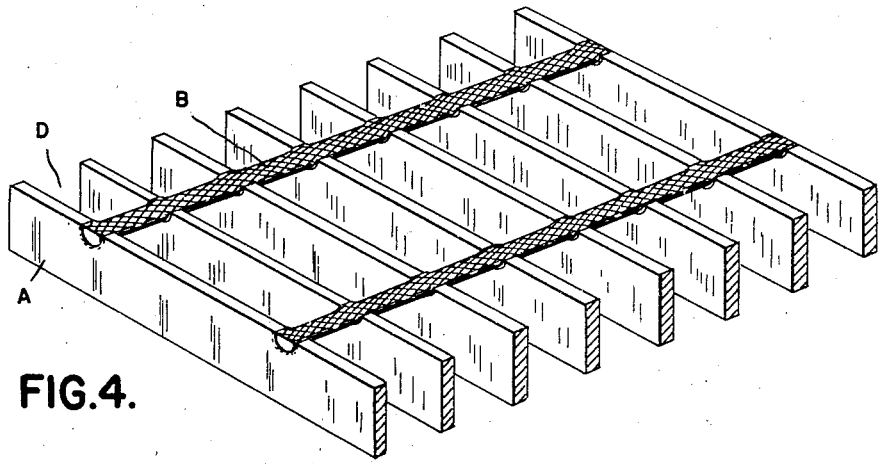
INVENTORS
LEO J. KNAPP
HENRY C. NEITZEL
BY
ATTORNEYS Aug. 15, 1939.   L. J. KNAPP ET AL   2,169,649
GRATING
Filed May 5, 1938   2 Sheets-Sheet 2

INVENTORS
LEO J. KNAPP
HENRY C. NEITZEL
BY
ATTORNEYS

Patented Aug. 15, 1939

2,169,649

UNITED STATES PATENT OFFICE 2,169,649

GRATING

Leo J. Knapp and Henry C. Neitzel, Detroit, Mich., assignors to Whitehead & Kales Company, River Rouge, Mich., a corporation of Michigan Application May 5, 1938, Serial No. 206,261

14 Claims. (Cl. 189—43)

This invention relates generally to a metallic structure such as a grating and refers more particularly to a stair tread and the method of making the same.

One of the essential objects of the invention is to provide a structure of this type wherein knurled, or otherwise roughened, transversely extending rods are pressure-welded into the upper edges of longitudinally extending supporting bars at predetermined points thereof to provide an apertured tread surface.

Another object is to provide a structure wherein provision is made in the apertures at the forward edge of said tread surface to designate the forward edge of the tread or step to distinguish it from the rest of said surface so that said tread possesses a safety factor and eliminates confusion or optical illusions while in use as one of a maze of such treads.

Another object is to provide a structure wherein the inserts occupy more than one-half the area of the apertures in which they are located and are constructed in such a way that they not only function as a safety element as aforesaid, but also cooperate with the knurled, transversely extending bars to provide a non-skid tread surface.

Another object is to improve the method of making structures of the type mentioned.

Other objects, advantages and novel details of construction of this invention will be made more apparent as this description proceeds, especially when considered in connection with the accompanying drawings, wherein:

Figure 1 is a detail view of one of the transverse bars before being knurled;

Figure 2 is a view similar to Figure 1 showing the bar after being knurled;

Figure 3 shows an assembly of spaced supporting bars and spaced knurled bars resting upon the upper edges thereof in position to be welded thereto;

Figure 4 is a view similar to Figure 3 after the transverse bars have been pressure-welded into the supporting bars;

Figure 5:
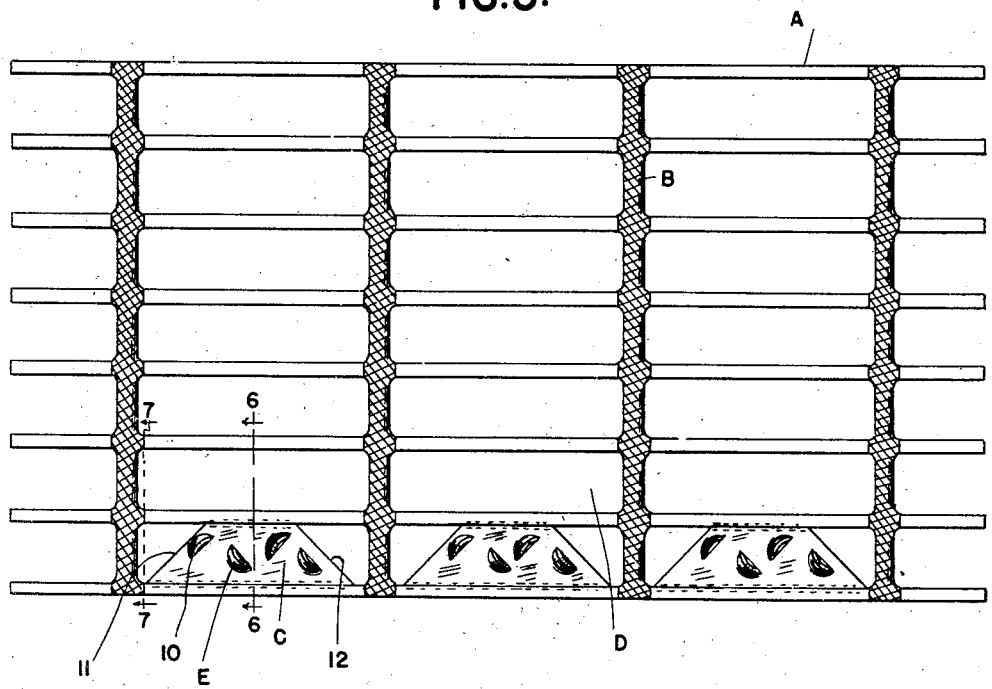
Figure 5 is a top plan view of the assembly after the pressed metal inserts have been secured in position.

Referring now to the drawings, A are the longitudinally extending supporting bars, B are the transversely extending bars, and C are the inserts of a stair tread embodying our invention.

Figure 7:
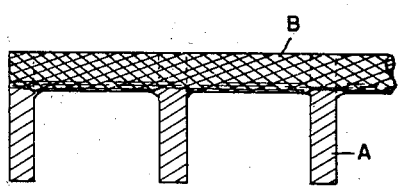
Figure 7 is a sectional view taken on the line 7—7 of Figure 5.
Figure 6:
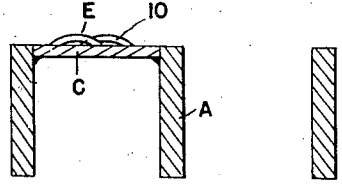
Figure 6 is a sectional view taken on the line 6—6 of Figure 5.

As shown, the supporting bars A are of substantially rectangular shape in cross section and are arranged on edge in substantially parallel relation, while the transverse bars B are in the form of knurled rods and are pressure-welded into the upper edges of the supporting bars A at spaced points thereof. By referring to Figure 7 it will be noted that the upper edges of the bars A and B are substantially flush and thus provide an apertured tread surface.

The inserts C are located in the openings D formed by the intersecting bars at the forward edge of the stair tread to distinguish said edge from the rest of the tread surface. Preferably these inserts C are substantially flat sheet metal stampings of sufficient size to occupy more than one-half the area of the openings D in which they are located and are welded at opposite longitudinal edges thereof to the supporting bars A. As shown, the upper faces of these inserts C are substantially flush with the upper edges of the bars A and are provided with tread projections E. Preferably these projections E are sheared from the metal of the inserts and are semi-domical in configuration. By referring to Figure 5 it will be noted that the straight edges 10 of said projections are inclined approximately forty-five degrees to both the longitudinally extending and the transversely extending bars A and B. Likewise, opposite ends 11 and 12, respectively, of these inserts are preferably inclined approximately forty-five degrees to both the transversely and longitudinally extending bars. Thus, the inclined edges 11 and 12 tend to set off the inserts C from the parallel bars to more clearly designate the forward edge of the tread surface from the rest of the structure. Moreover, the projections E cooperate with the knurled upper surfaces of the transverse bars B to provide a non-slip tread. Inasmuch as the inserts C are substantially flat instead of angles or channels, the over-all weight of the structure is less, and the cost of manufacture is likewise less. Preferably these inserts C are put in last after the grating is completely formed.

Initially, the transversely extending bars B are plain cylindrical rods as illustrated in Figure 1. They are then knurled as illustrated in Figure 2. Following the knurling operation, the knurled bars B are laid across the upper edges of a plurality of supporting bars A spaced apart as desired in a suitable jig, as illustrated in Figure 3. The assembly is then subjected to electric resistance welding so that the transverse bars B will be pressed into the upper edges of the longitudinal bars A to provide the grating illustrated in Figure 4. The inserts C are then inserted into the openings D and welded to the adjacent longitudinal bars A to complete the structure.

Inasmuch as the cylindrical bars B are knurled before being welded to the supporting bars A, it is possible to obtain a better weld between the parts because the knurling operation removes the scale from the cylindrical bars and provides a multiplicity of points or lines for contact with the bars A. Such point or line contact builds up greater resistance for electric welding and therefore provides better fusion of the metal. If such transverse bars B were not knurled or otherwise roughened before being welded, it would be necessary to pickle them before the welding operation, and this of course would add to the cost of manufacture. Thus, the knurling of the bars B not only facilitates welding, but also provides an efficient tread surface after the parts are assembled.

If desired, the inserts C may be omitted entirely, and the grating such as that illustrated in Figure 4 embodying our invention may be made in appropriate sizes for floors, sidewalks, safety zones, and other similar structures. Thus, depending upon the size and the use of inserts C, the grating is adapted for many purposes.

What we claim as our invention is:

1. A metallic structure comprising a plurality of rigid spaced supporting bars, a plurality of rigid spaced transverse bars secured to said supporting bars and forming therewith an apertured tread surface, and substantially flat inserts within and occupying more than one-half the area of the apertures at the forward edge of said structure to designate such forward edge and distinguish it from the rest of the structure, said inserts having non-parallel ends inclined relative to both the supporting and transverse bars.

2. A metallic structure comprising a plurality of rigid spaced supporting bars, a plurality of rigid spaced transverse bars secured to said supporting bars and forming therewith a substantially flat apertured tread surface, and pressed metal inserts within the apertures at the forward edge of said structure to designate such forward edge and distinguish it from the rest of the structure, said inserts having non-parallel edges at opposite ends thereof inclined at approximately forty-five degrees to both the transverse and supporting bars.

3. A grating having a row of vertical openings along an edge thereof, and means for distinguishing said edge from the rest of the structure including inserts within said openings, opposite ends of said inserts being between but spaced from opposite ends of said openings, opposite sides of said inserts being between and secured to opposite sides of said openings.

4. A grating having a row of vertical openings along an edge thereof, and means for distinguishing said edge from the rest of the structure including inserts within said openings, one in each opening, opposite ends of said inserts being non-parallel to and free of opposite ends of said openings, and opposite sides of said inserts being parallel and secured to opposite sides of said openings.

5. A grating having a row of openings along its forward edge, substantially flat inserts within said openings, the shape of said inserts being different from the shape of said openings, whereby said inserts cooperate with the edges of said openings to distinguish the forward edge of the grating from the rest of the structure.

6. A grating having a plurality of vertical openings therein, and means for distinguishing one edge of the grating from the rest of the structure including inserts within the openings adjacent said edge, opposite ends of said inserts being non parallel to and free of opposite ends of the openings in which they are located, and opposite sides of said inserts being secured to opposite sides of the said openings.

7. A grating having a plurality of vertical openings therein, and means for distinguishing one edge of the grating from the rest of the structure including pressed metal inserts within the openings adjacent said edge, opposite ends of said inserts being non parallel to opposite ends of the openings in which they are located, and opposite sides of said inserts being secured to opposite sides of the said openings.

8. A metal grating having a plurality of vertical openings therein, and means for distinguishing one edge of the grating from the rest of the structure including metal inserts wholly within the openings adjacent said edge, one in each opening, opposite ends of said inserts being between but non parallel to opposite ends of said openings, and opposite sides of said inserts being between and secured to opposite sides of said openings.

9. A metallic structure comprising a plurality of rigid, spaced supporting bars, a plurality of rigid spaced, transverse bars secured to said supporting bars and forming therewith an apertured tread surface, and substantially flat inserts within the apertures at the forward edge of said structure to designate such forward edge and distinguish it from the rest of the structure, opposite ends of said inserts being non parallel relative to both the supporting and transverse bars, and opposite sides of said inserts being rigid with the supporting bars.

10. A metallic structure comprising a plurality of rigid spaced supporting bars, a plurality of rigid spaced transverse bars secured to said supporting bars and forming therewith an apertured tread surface, and inserts within the apertures at the forward edge of said structure to designate such forward edge and distinguish it from the rest of the structure, opposite ends of said inserts being between and non parallel to said transverse bars, and opposite sides of said inserts being between and secured to said supporting bars.

11. A metallic structure comprising a plurality of rigid spaced supporting bars, a plurality of rigid spaced transverse bars secured to said supporting bars and forming therewith an apertured tread surface, and pressed metal inserts within the apertures at the forward edge of said structure to designate such forward edge and distinguish it from the rest of the structure, opposite ends of said inserts being between and non parallel to said transverse bars.

12. A metallic structure comprising a plurality of rigid spaced supporting bars, a plurality of rigid spaced transverse bars secured to said supporting bars and forming therewith an apertured tread surface, and substantially flat inserts within the apertures at the forward edge of said structure to designate such forward edge and distinguish it from the rest of the structure, opposite ends of said inserts being between but non parallel relative to said transverse bars.

13. A grating having a plurality of vertical openings therein, and means for distinguishing an edge of said grating from the rest of the structure including inserts within the openings adjacent said edge, opposite ends of said inserts being non parallel to opposite ends of the openings in which they are located.

14. A grating having a plurality of vertical openings therein, and means for distinguishing an edge of said grating from the rest of the structure including inserts within the openings adjacent said edge, opposite ends of said inserts being inclined relative to opposite ends of the openings in which they are located, and opposite sides of said inserts being between and substantially parallel to opposite sides of the said openings.

LEO J. KNAPP.
HENRY C. NEITZEL.